US009672612B2

United States Patent
Hirota et al.

(10) Patent No.: US 9,672,612 B2
(45) Date of Patent: Jun. 6, 2017

(54) IMAGE PROCESSING DEVICE, IMAGE PROCESSING METHOD, AND IMAGE PROCESSING PROGRAM FOR CLASSIFICATION OF REGION OF INTEREST FROM INTRALUMINAL IMAGES BASED ON INITIAL REGION FEATURE AND EXPANSION REGION FEATURE

(75) Inventors: Masashi Hirota, Hachioji (JP); Yamato Kanda, Hino (JP); Makoto Kitamura, Hachioji (JP); Takehiro Matsuda, Hachioji (JP); Takashi Kono, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 909 days.

(21) Appl. No.: 13/545,529

(22) Filed: Jul. 10, 2012

(65) Prior Publication Data

US 2013/0027532 A1    Jan. 31, 2013

(30) Foreign Application Priority Data

Jul. 29, 2011    (JP) .................. 2011-167270

(51) Int. Cl.
*H04N 7/18*    (2006.01)
*G06T 7/00*    (2017.01)
(Continued)

(52) U.S. Cl.
CPC .......... *G06T 7/0012* (2013.01); *G06K 9/4652* (2013.01); *G06T 7/11* (2017.01);
(Continued)

(58) Field of Classification Search
CPC ............ G06K 2209/053; G06K 9/4652; G06T 2207/10016; G06T 2207/10024;
(Continued)

(56) References Cited

U.S. PATENT DOCUMENTS 5,832,103 A * 11/1998 Giger et al. .................. 382/130
7,639,848 B2 * 12/2009 Qian et al. .................... 382/128
(Continued)

FOREIGN PATENT DOCUMENTS

EP    2 405 398 A1    1/2012
JP    2005-192880    7/2005
JP    2008-307229 A    12/2008

OTHER PUBLICATIONS

Japanese Office Action dated Mar. 31, 2015 from related Japanese Patent Application No. 2011-167270, together with an English language translation.

(Continued)

*Primary Examiner* — Francis G Geroleo
(74) *Attorney, Agent, or Firm* — Scully, Scott, Murphy & Presser, P.C.

(57) ABSTRACT

An image processing device classifies a region of interest included in an image into multiple classification items. The image processing device has: an initial region detector that detects at least part of the region of interest and sets the part as an initial region; an expansion region detector that detects an expansion region by expanding the initial region; and a region determining unit that calculates feature data of the initial region and the expansion region, and determines, based on the feature data, to which of the multiple classification items the region of interest belongs.

13 Claims, 12 Drawing Sheets

(51) Int. Cl.
  *G06K 9/46* (2006.01)
  *G06T 7/11* (2017.01)
  *G06T 7/12* (2017.01)
  *G06T 7/155* (2017.01)
  *G06T 7/90* (2017.01)
  *G06T 7/187* (2017.01)

(52) U.S. Cl.
  CPC ............... *G06T 7/12* (2017.01); *G06T 7/155* (2017.01); *G06T 7/187* (2017.01); *G06T 7/90* (2017.01); *G06K 2209/053* (2013.01); *G06T 2207/10016* (2013.01); *G06T 2207/10024* (2013.01); *G06T 2207/10068* (2013.01); *G06T 2207/30028* (2013.01); *G06T 2207/30096* (2013.01)

(58) Field of Classification Search
  CPC . G06T 2207/10068; G06T 2207/20141; G06T 2207/30028; G06T 2207/30096; G06T 7/0012; G06T 7/0081; G06T 7/0083; G06T 7/0091; G06T 7/408
  USPC .................. 348/65; 382/128, 130, 131, 132
  See application file for complete search history.

(56) References Cited

U.S. PATENT DOCUMENTS

| | | | |
|---|---|---|---|
| 8,144,963 B2* | 3/2012 | Cascio et al. | 382/131 |
| 8,600,141 B2* | 12/2013 | Elter et al. | 382/132 |
| 2005/0232474 A1* | 10/2005 | Wei et al. | 382/128 |
| 2008/0292154 A1* | 11/2008 | Nishimura et al. | 382/128 |
| 2009/0196476 A1* | 8/2009 | Inoue | 382/128 |
| 2010/0092055 A1* | 4/2010 | Matsuda | 382/128 |
| 2011/0038523 A1* | 2/2011 | Boardman | G06T 7/0012 382/133 |
| 2011/0069876 A1* | 3/2011 | Kanda | 382/134 |
| 2011/0085717 A1* | 4/2011 | Matsuda | 382/128 |
| 2011/0158532 A1 | 6/2011 | Chung et al. | |

OTHER PUBLICATIONS

Iyatomi, H., et al., "Classification of melanocytic skin lesions from non-melanocytic lesions", 32nd Annual International Conference of the IEEE Engineering in Medicine and Biology Society, Buenos Aires, Argentina, Aug. 31-Sep. 4, 2010, pp. 5407-5410.

Extended European Search Report dated May 8, 2014 from related European Application No. 12 00 5362.4.

Japanese Laid-Open Patent Publication No. 2005-192880, dated Jul. 21, 2005, together with English Abstract.

\* cited by examiner

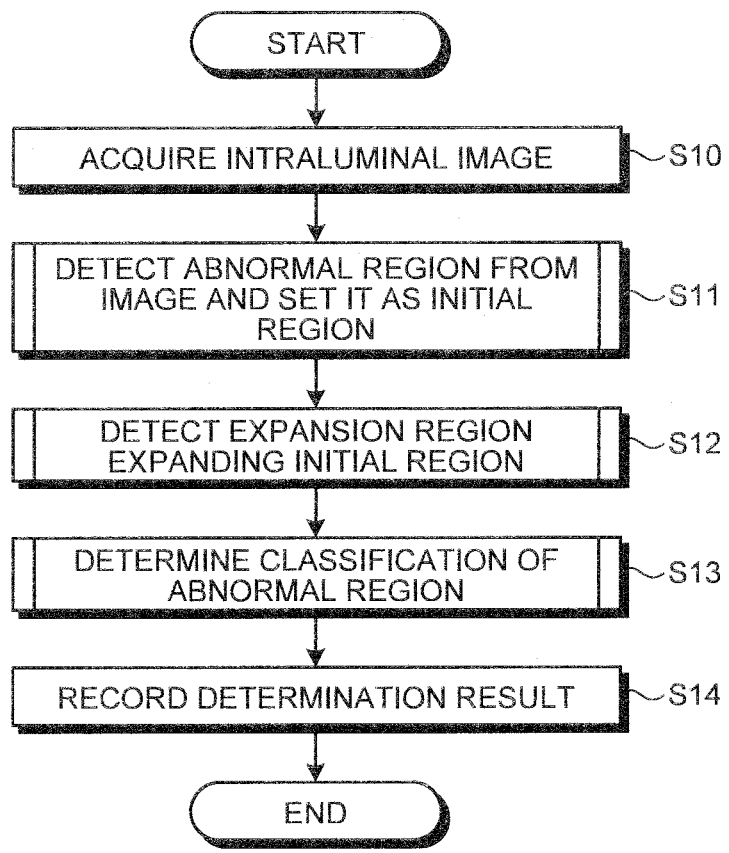

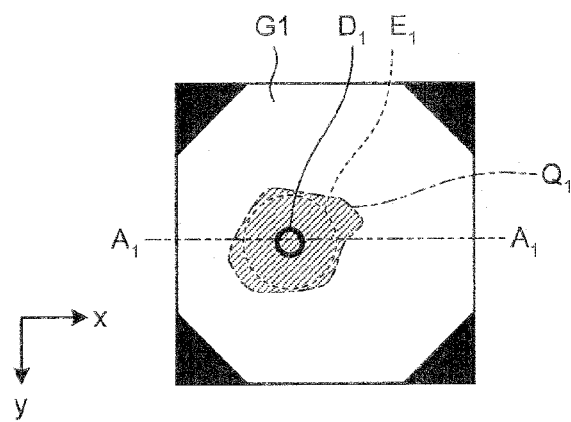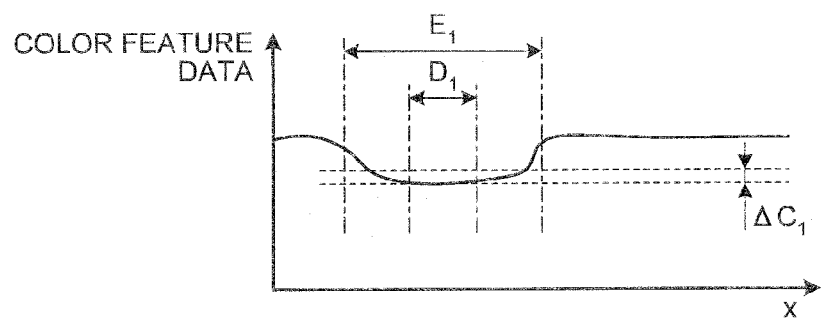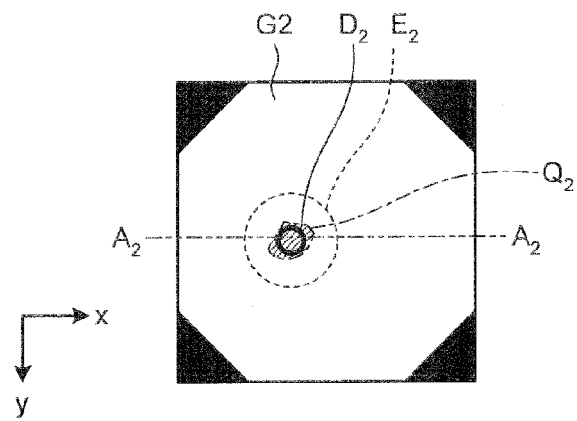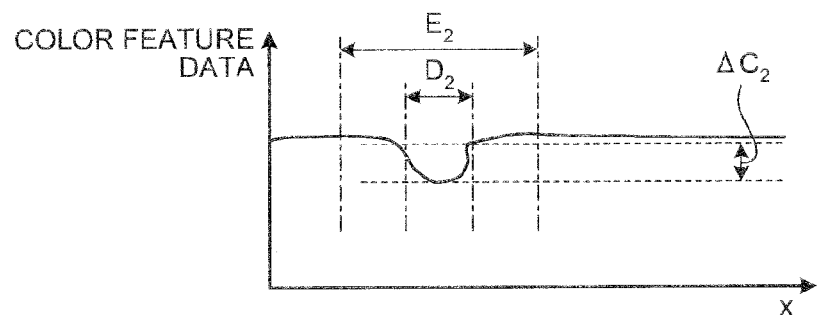

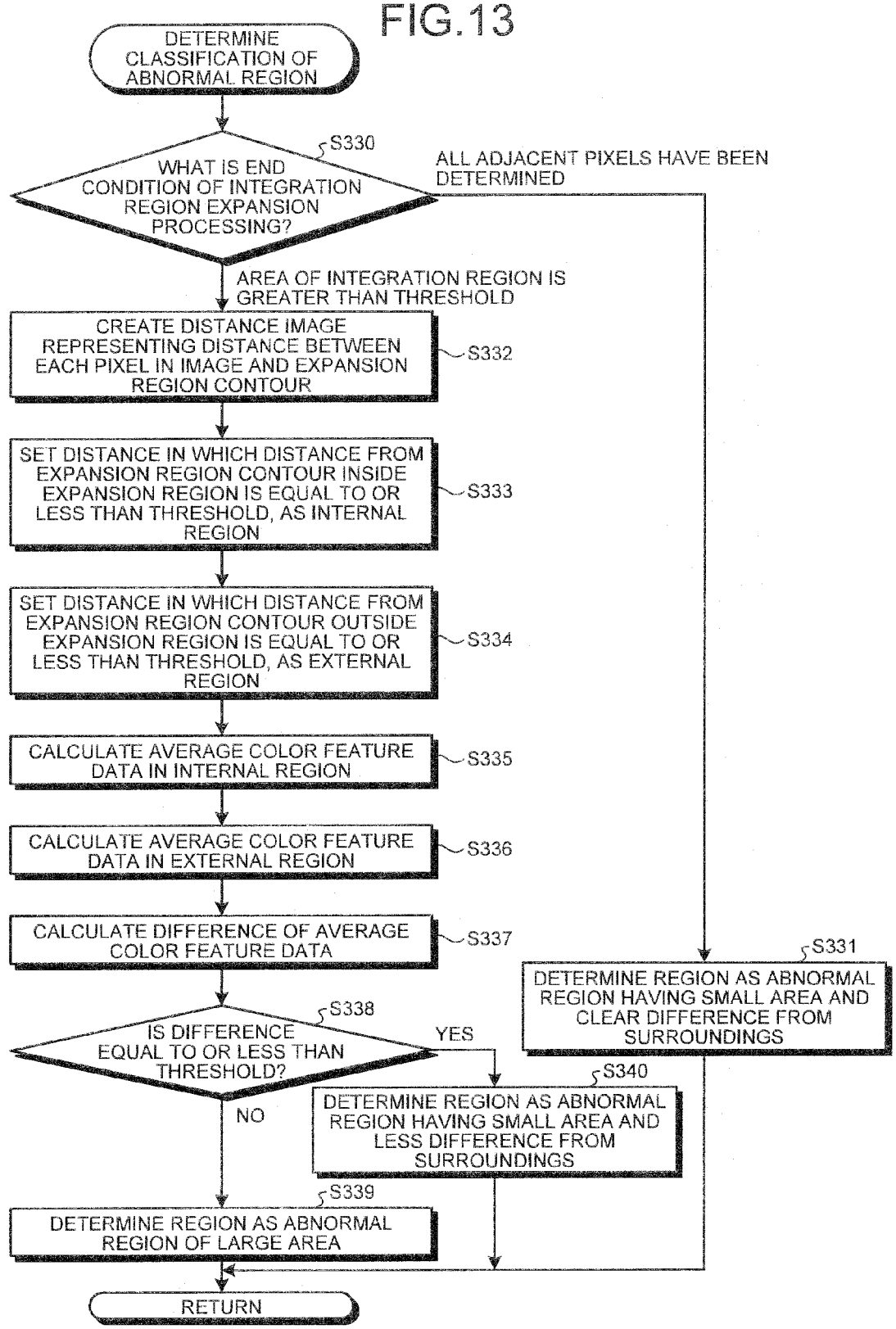

IMAGE PROCESSING DEVICE, IMAGE PROCESSING METHOD, AND IMAGE PROCESSING PROGRAM FOR CLASSIFICATION OF REGION OF INTEREST FROM INTRALUMINAL IMAGES BASED ON INITIAL REGION FEATURE AND EXPANSION REGION FEATURE

CROSS-REFERENCE TO RELATED APPLICATIONS

This application is based upon and claims the benefit of priority from Japanese Patent Application No. 2011-167270, filed on Jul. 29, 2011, the entire contents of which are incorporated herein by reference.

BACKGROUND OF THE INVENTION

1. Field of the Invention

The present invention relates to an image processing device, an image processing method and an image processing program that perform image processing on an image imaging a biological body.

2. Description of the Related Art

In recent years, as a medical observation apparatus that can perform an observation in a patient lumen in a non-invasive manner, an endoscope is widely prevalent. Recently, a capsule endoscope becomes prevalent, which is inserted in a subject, proceeds in a lumen by peristaltic motion and captures an image.

Meanwhile, a diagnosis using such a medical observation apparatus is an operation of requiring many experiences and imposing a heavy burden on a user (such as a doctor). Especially, in an examination using a capsule endoscope, for example, since several tens of thousands of intraluminal images are acquired over about eight hours, it is a quite difficult operation to identify a lesion region or the like from a large amount of intraluminal images. Therefore, various medical diagnosis support functions supporting a diagnosis are desired, and, as one of image recognition techniques to realize the support functions, a technique of automatically detecting an abnormal region (i.e. region of interest) from intraluminal images and illustrating an image to be intensively diagnosed is proposed.

For example, Japanese Laid-open Patent Publication No. 2005-192880 discloses an image processing method of calculating feature data based on a color tone in an input image and determining an abnormal finding region in the image based on the feature data.

SUMMARY OF THE INVENTION

An image processing device according to an aspect of the present invention classifies a region of interest included in an image into multiple classification items, the image processing device including: an initial region detector that detects at least part of the region of interest and sets the part as an initial region; an expansion region detector that detects an expansion region by expanding the initial region; and a region determining unit that calculates feature data of the initial region and the expansion region, and determines, based on the feature data, to which of the multiple classification items the region of interest belongs.

An image processing method according to another aspect of the present invention classifies a region of interest included in an image into multiple items, the method including: detecting at least part of the region of interest and setting the part as an initial region; detecting an expansion region by expanding the initial region; and calculating feature data of the initial region and the expansion region, and determining, based on the feature data, to which of the multiple classification items the region of interest belongs.

An image processing program according to still another aspect of the present invention causes a computer to perform processing of classifying a region of interest included in an image into multiple classification items, the processing including: detecting at least part of the region of interest and setting the part as an initial region; detecting an expansion region by expanding the initial region; and calculating feature data of the initial region and the expansion region, and determining, based on the feature data, to which of the multiple classification items the region of interest belongs.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table illustrating relationships between classification items of an abnormal region and check priority;

FIG. 3 is a flowchart illustrating operations of an image processing device illustrated in FIG. 1;

FIG. 8A is a schematic view illustrating a case where an expansion region stays within an abnormal region;

FIG. 8B is a graph illustrating changes of color feature data in the case illustrated in FIG. 8A;

FIG. 9A is a schematic view illustrating a case where an expansion region is expanded over an abnormal region;

FIG. 9B is a graph illustrating changes of color feature data in the case illustrated in FIG. 9A;

FIG. 13 is a flowchart illustrating specific processing performed by a region determining unit illustrated in FIG. 12;

DETAILED DESCRIPTION OF THE PREFERRED EMBODIMENTS

Figure 1:
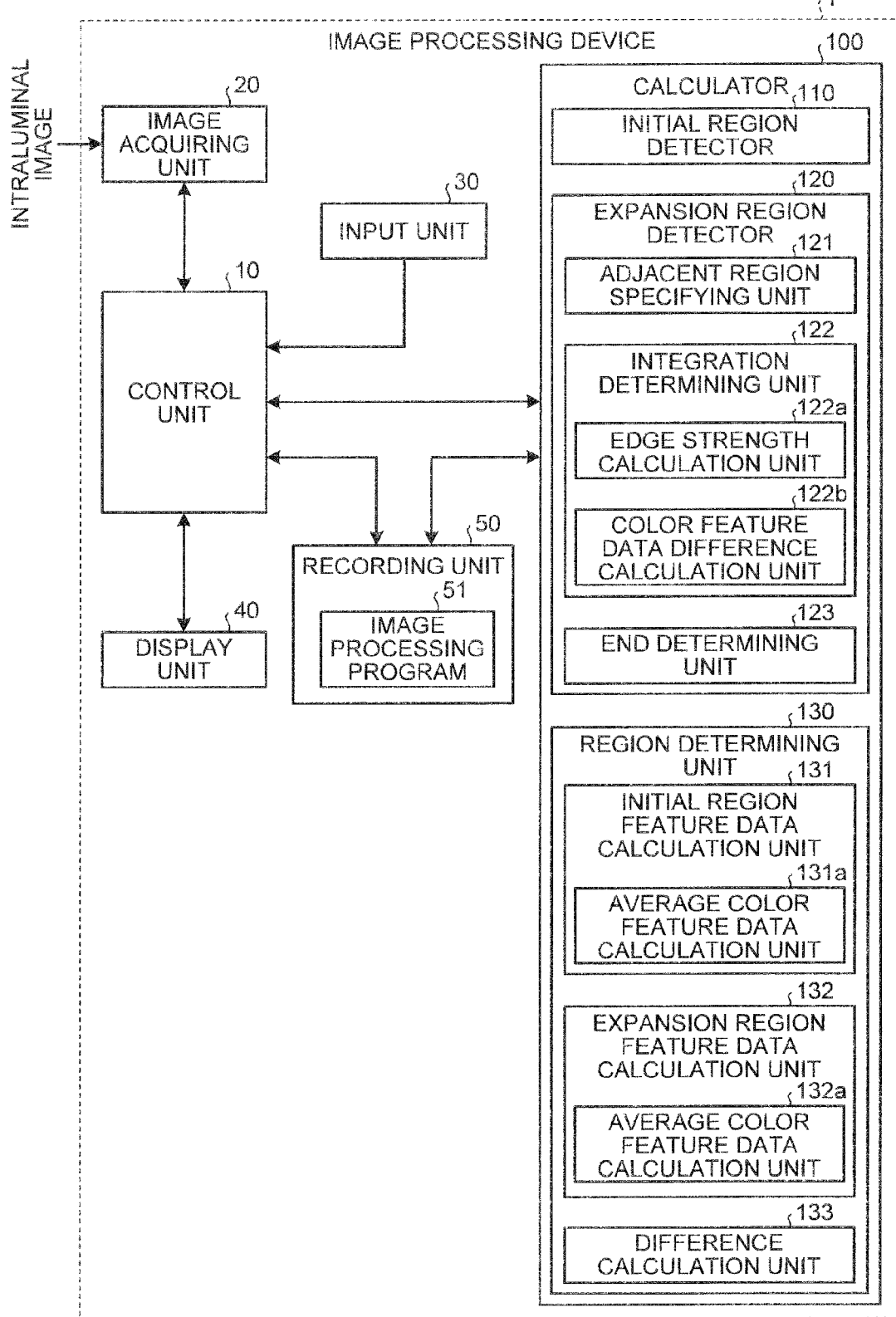
FIG. 1 is a block diagram illustrating a configuration of an image processing device according to a first embodiment of the present invention.

In the following, an image processing device, an image processing method and an image processing program according to embodiments of the present invention will be explained with reference to the drawings. The present invention is not limited to these embodiments. In the description of each drawing, the same reference numerals are attached to the same components.

The following embodiments explain, as an example, processing for an intraluminal image (which hereinafter may be simply referred to as "image") acquired by imaging the inside of a lumen of a subject using a medical observation apparatus such as a capsule endoscope. This intraluminal image is, for example, a color image having pixel levels (i.e. pixel values) with respect to color components R (Red), G (Green) and B (Blue) in each pixel position.

The present invention is not limitedly applied to an intraluminal image but is widely applicable to an image acquired by other general image acquiring devices.

First Embodiment

FIG. 1 is a block diagram illustrating an image processing device according to a first embodiment of the present invention. An image processing device 1 illustrated in FIG. 1 is provided with a control unit 10 that controls the overall operation of the image processing device 1, an image acquiring unit 20 that acquires image data corresponding to a series of images captured by a medical observation apparatus such as a capsule endoscope, an input unit 30 that receives an input signal input from the outside, a display unit 40 that performs various displays, a recording unit 50 that stores the image data acquired by the image acquiring unit 20 and various programs, and a calculator 100 that performs predetermined image processing on image data.

The control unit 10 is realized by hardware such as a CPU, and, by reading the various programs stored in the recording unit 50, gives an instruction or transfers data to each unit configuring the image processing device 1 according to image data input from the image acquiring unit 20 and an operation signal input from the input unit 30, so as to control the overall operation of the image processing device 1 in an integrated manner.

The image acquiring unit 20 is adequately configured according to an aspect of a system including a medical observation apparatus. For example, in a case where the medical observation apparatus is a capsule endoscope and a transportable recording medium is used to exchange image data with the medical observation apparatus, the image acquiring unit 20 is detachably attached to this recording medium and configured with a reader device that reads image data recorded in the recording medium. Also, in the case of installing a server to store image data of an image captured by the medical observation apparatus, the image acquiring unit is configured with, for example, a communication device connected to the server, so as to acquire image data. Alternatively, the image acquiring unit 20 may be configured with, for example, an interface device that inputs an image signal from a medical observation apparatus such as an endoscope via a cable.

The input unit 30 is realized by an input device such as a keyboard, a mouse, a touch panel and various switches, and outputs a received input signal to the control unit 10.

The display unit 40 is realized by a display device such as an LCD and an EL display, and displays various screens including an intraluminal image under the control of the control unit 10.

The recording unit 50 is realized by various IC memories such as a ROM or RAM including a recordable flash memory, a built-in hard disk or a hard disk connected by a data communication terminal, or an information recording medium such as a CD-ROM and its reading device. In addition to image data acquired by the image acquiring unit 20, the recording unit 50 stores a program to cause the image processing device 1 to execute various functions and stores data used during execution of this program. To be more specific, the recording unit 50 records an image processing program 51 of detecting, from an intraluminal image, a region of interest (hereinafter referred to as "abnormal region") having a different characteristic from the surrounding and determining into which of predetermined classification items the abnormal region is classified.

FIG. 2 is a table illustrating relationships between classification items of an abnormal region and a priority (i.e. check priority) of images that should be checked by the user at the time of diagnosis. Here, as an example, it is possible to classify an abnormal region based on the area size and the degree of concentration difference with the surrounding color (for example, red). Here, the check priority of an abnormal region of a large area is high, regardless of the degree of concentration difference. Meanwhile, regarding an abnormal region of a small area, although an abnormal region of a large concentration difference (i.e. the color is significantly deep or pale compared to the surroundings) has a high check priority, an abnormal region of a small concentration difference has a lower check priority than the former. Therefore, in the present embodiment, abnormal regions detected from intraluminal images are classified into three items of an abnormal region of a large area, an abnormal region of a small area and large concentration difference with the surroundings, and an abnormal region of a small area and small concentration difference with the surroundings. Here, a threshold to determine a large/small area and a threshold to determine a large/small concentration difference are set based on, for example, the user's experience.

The calculator 100 is realized by hardware such as a CPU, and, by reading the image processing program 51, performs image processing on image data corresponding to intraluminal images and performs various kinds of calculation processing to classify abnormal regions detected from the images into the three classification items described above.

Next, a specific configuration of the calculator 100 will be explained.

As illustrated in FIG. 1, the calculator 100 is configured with an initial region detector 110 that detects a region corresponding to an abnormal region in an image as an initial region, an expansion region detector 120 that detects an expansion region by expanding the initial region, and a region determining unit 130 that determines to which of the classification items a region of interest including the abnormal region belongs, based on the feature data of the initial region and the expansion region.

The expansion region detector 120 is configured with an adjacent region specifying unit 121 that sets the initial region as an initial state of an integration region and specifies an adjacent region that is adjacent to the integration region, an integration determining unit 122 that determines whether to integrate the adjacent region to the integration region, based on the feature data of the integration region and the adjacent region, and an end determining unit 123 that determines whether to finish an integration of the adjacent region to the integration region, based on an area of the integration region. To be more specific, the integration determining unit 122 includes an edge strength calculation unit 122a that calculates the edge strength between the integration region and the adjacent region, and a color feature data difference calculation unit 122b that calculates a difference of color feature data between the integration region and the adjacent region, and determines whether to integrate the adjacent region to the integration region, based on the edge strength and the difference of the color feature data.

The region determining unit 130 is configured with an initial region feature data calculation unit 131 that calculates the feature data in the initial region (hereinafter referred to as "initial region feature data"), an expansion region feature data calculation unit 132 that calculates the feature data in the expansion region (hereinafter referred to as "expansion region feature data") and a difference calculation unit 133 that calculates a difference between the initial region feature data and the expansion region feature data, and determines to which of the classification items the region of interest belongs, based on the difference calculated by the difference calculation unit 133. Among these, the initial region feature data calculation unit 131 includes an average color feature data calculation unit 131a that calculates an average value of the color feature data (which hereinafter may be referred to as "average color feature data") in the initial region. Also, the expansion region feature data calculation unit 132 includes an average color feature data calculation unit 132a that calculates an average value of the color feature data (which hereinafter may be referred to as "average color feature data") in the expansion region.

Next, operations of the image processing device 1 illustrated in FIG. 1 will be explained. FIG. 3 is a flowchart illustrating operations of the image processing device 1.

First, in step S10, the image acquiring unit 20 acquires image data of a series of intraluminal images captured by a medical observation apparatus and stores it in the recording unit 50. The calculator 100 sequentially reads image data corresponding to images on which image processing is performed.

In subsequent step S11, the initial region detector 110 detects an abnormal region from an image and sets the detected abnormal region as an initial region. The detected abnormal region may be the whole of the abnormal region appeared on the image or may be part of the inside of the abnormal region appeared on the image. As a detection method of abnormal regions, various well-known methods are available. In the following, as an example, a method of detecting abnormal regions based on the feature data of each pixel included in intraluminal images will be explained.

Figure 4:
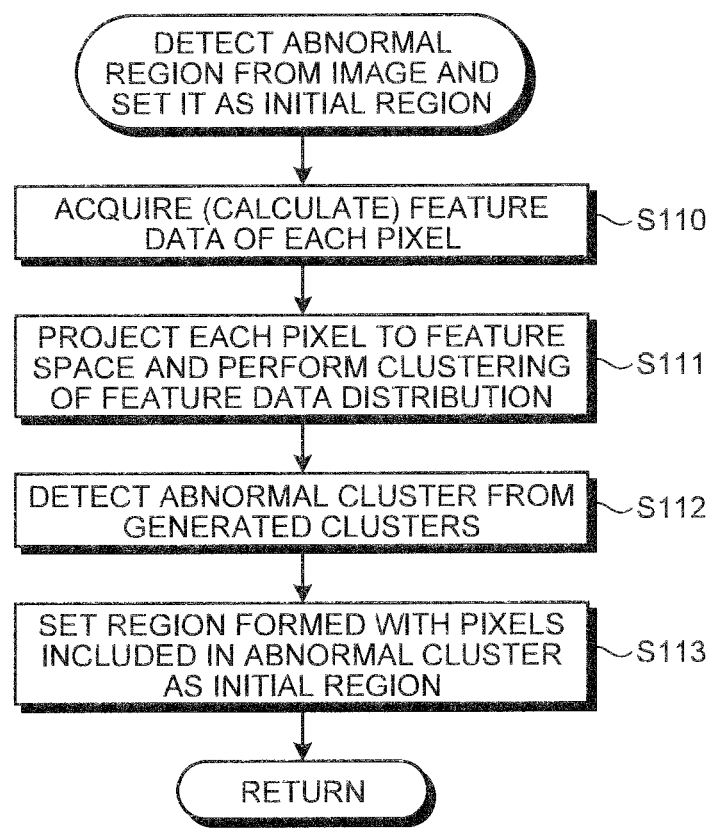
FIG. 4 is a flowchart illustrating specific processing performed by an initial region detector illustrated in FIG. 1.

FIG. 4 is a flowchart specifically illustrating processing in step S11.

First, in step S110, the initial region detector 110 acquires or calculates the feature data of each pixel included in the intraluminal image. As the feature data, the values of R, G and B components of each pixel or the value of brightness, color difference, saturation, intensity or color contrast can be used. In the first embodiment, as the feature data, chromaticity $C_R=r/(r+g+b)$ and $C_G=g/(r+g+b)$ are used (where "r," "g" and "b" represent the values of components "R," "G" and "B" of pixels, respectively). Here, normally, a color tone change in an intraluminal image depends on light absorption variation, to be more specific, it is the most dependent on an absorption band (or wavelength) of hemoglobin in blood vessels. Therefore, when a mucosal color tone in an intraluminal image is a red color tone, the value of the former $C_R$ is relatively large and the value of the latter $C_G$ is small. Also, when the mucosal color tone is a white color tone by discoloration or the like, the value of the latter $C_G$ relatively increases.

In subsequent step S111, the initial region detector 110 projects each pixel to a feature space having components of the feature data $C_R$ and $C_G$, and performs clustering of feature data distribution.

In step S112, the initial region detector 110 detects a cluster reflecting an abnormal color tone (i.e. abnormal region cluster) from clusters generated as a result of the clustering. Regarding the detection of the abnormal region cluster, for example, the detection is possible by comparing the center of gravity coordinate of each cluster and a predetermined threshold.

Figure 5A:
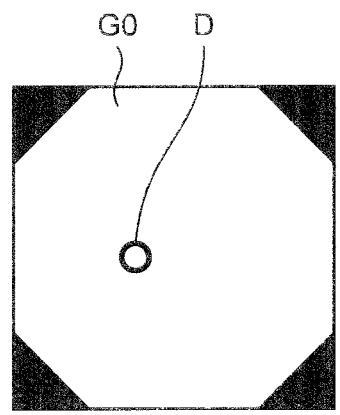
FIGS. 5A and 5B are schematic views illustrating concept of expanding an initial region detected from an intraluminal image.

In step S113, the initial region detector 110 detects a region on the image formed with pixels included in the abnormal cluster and sets this as an initial region. FIG. 5A is a schematic view illustrating an initial region D detected from an image G0 of the image processing target.

Regarding details of a detection method of abnormal regions, for example, see Japanese Laid-open Patent Publication No. 2005-192880.

After that, processing returns to the main routine.

Figure 5B:
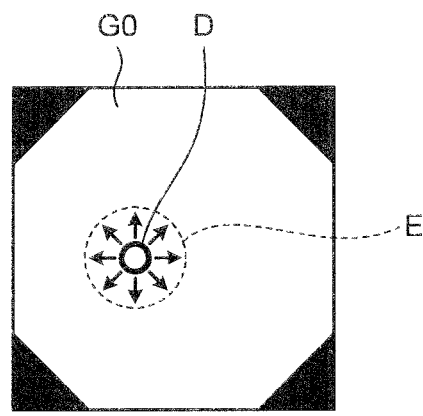

In step S12, as illustrated in FIG. 5B, by integrating adjacent pixels to the initial region D based on a predetermined integration condition, the integration determining unit 122 detects an expansion region E expanding the initial region D.

Figure 6:
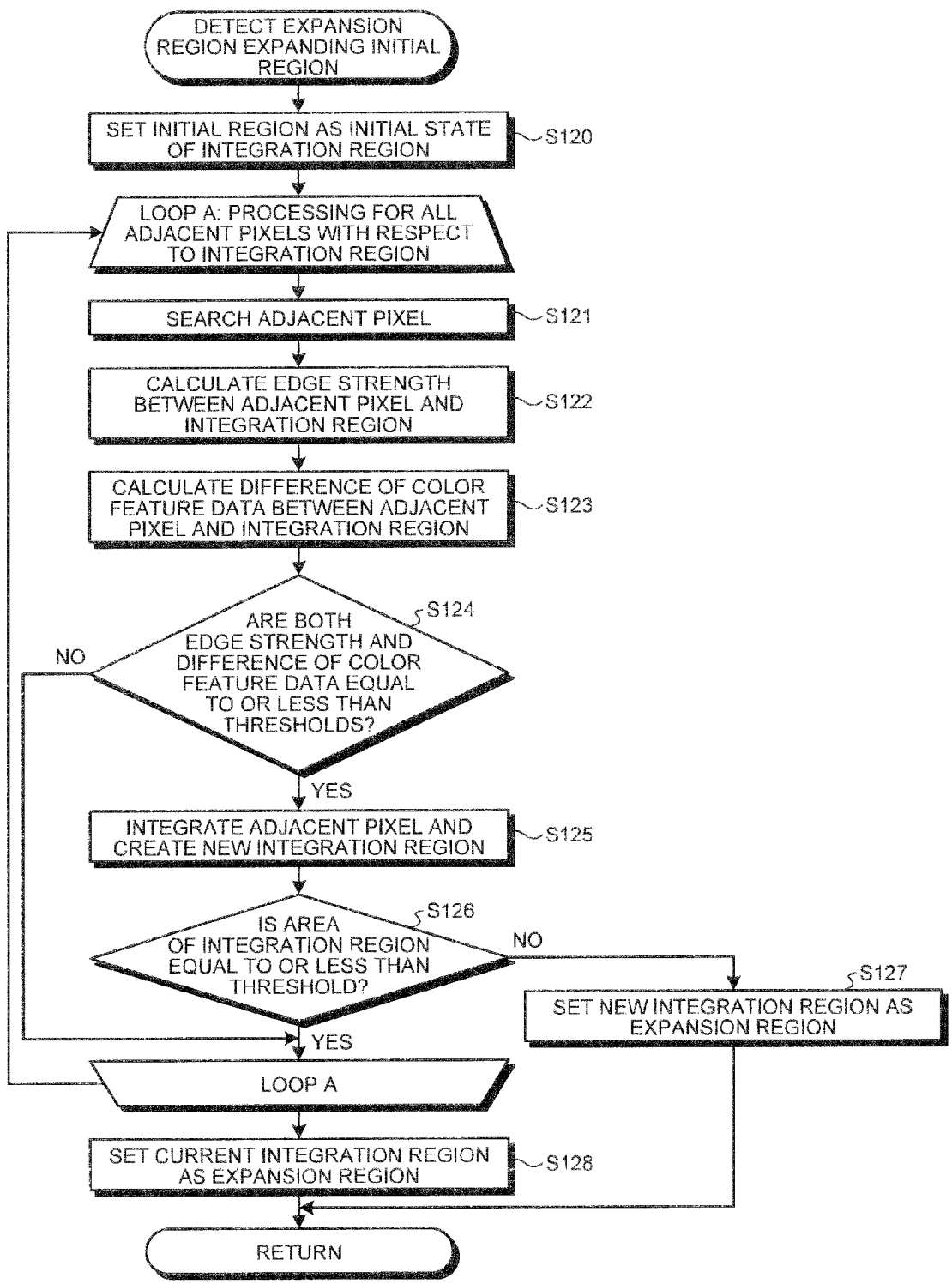
FIG. 6 is a flowchart illustrating specific processing performed by an expansion region detector illustrated in FIG. 1.

FIG. 6 is a flowchart specifically illustrating processing in step S12.

First, in step S120, the expansion region detector 120 sets the initial region D as an initial state of the integration region.

Subsequently, the expansion region detector 120 performs processing of loop A on all pixels adjacent to the set integration region (hereinafter referred to as "adjacent pixels").

First, in step S121, the adjacent region specifying unit 121 searches an adjacent pixel of the integration region.

In step S122, the edge strength calculation unit 122a calculates the edge strength between the searched adjacent pixel and the integration region. In the first embodiment, a difference in the R component between the adjacent pixel and a pixel, which is within the integration region and adjacent to the adjacent pixel, is used as the edge strength.

In step S123, the color feature data difference calculation unit 122b calculates a difference of color feature data between the adjacent pixel and the integration region. In the first embodiment, a G/R value that is a ratio of the R component and the G component is used as color feature data, and a difference between the G/R value of the adjacent pixel and an average G/R value of pixels included in the integration region is calculated.

In step S124, the integration determining unit 122 determines whether the edge strength calculated in step S122 is equal to or less than a predetermined threshold Th_edge and the difference of color feature data calculated in step S123 is equal to or less than a predetermined threshold Th_ch. For example, when there is a structural boundary between the adjacent pixel, which is a determination target, and the integration region, the edge strength may be greater than the threshold Th_edge. Also, when there is a boundary of deep and pale regions between the adjacent pixel, which is the determination target, and the integration region, the difference of color feature data may be greater than the threshold Th_ch. The determination in step S124 is made so as not to include an adjacent pixel having such a structure boundary or color boundary in the integration region.

When it is determined that both the edge strength and the difference of color feature data are equal to or less than the thresholds (step S124: Yes), the expansion region detector 120 integrates the adjacent pixel of the determination target to the integration region and creates a new integration region (step S125).

In step S126, the end determining unit 123 determines whether the area of the integration region is equal to or less than a predetermined threshold Th_area. From a standpoint of a size suitable for observation, this threshold Th_area is determined based on experiences of the user.

When it is determined that the area of the integration region is equal to or less than the threshold Th_area (step S126: Yes), the expansion region detector 120 repeats the processing of loop A on an adjacent pixel that is not set as a determination target yet among adjacent pixels in the new integration region.

By contrast, when it is determined that the area of the integration region is greater than the threshold Th_area (step S126: No), the expansion region detector 120 finishes the detection processing in the expansion region and sets the newly created integration region as an expansion region (step S127). After that, the processing returns to the main routine.

When it is determined that one or both of the edge strength and the difference of color feature data are greater than the thresholds in step S124 (step S124: No), the expansion region detector 120 does not integrate the adjacent pixel of the determination target and repeats the processing of loop A on an adjacent pixel that is not determined. When the processing on all adjacent pixels surrounding the integration region is finished, the detection processing in the expansion region is finished and the current integration region is set as an expansion region (step S128). After that, the processing returns to the main routine.

In step S13, the region determining unit 130 determines classification of an abnormal region detected from an image (see FIG. 2), based on the area of the expansion region E and the color feature data of the initial region D and the expansion region E.

Figure 7:
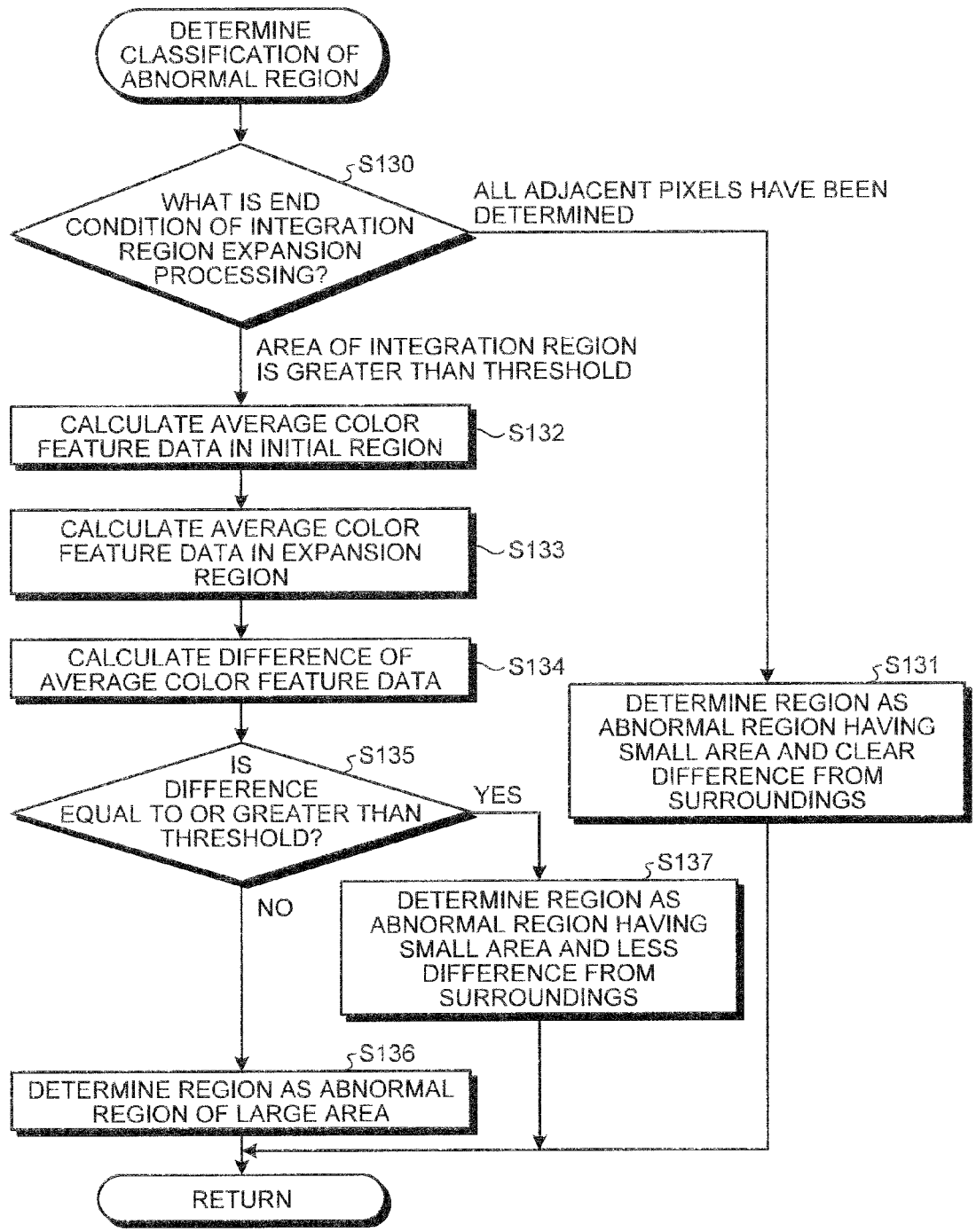
FIG. 7 is a flowchart illustrating specific processing performed by a region determining unit illustrated in FIG. 1.

FIG. 7 is a flowchart specifically illustrating processing in step S13.

First, in step S130, the region determining unit 130 determines an end condition at the time of the end of the integration region expansion processing (i.e. processing in loop A) in step S12.

When the determination for all adjacent pixels of the integration region is finished to break out of loop A (step S130: all adjacent pixels have been determined), the region determining unit 130 determines an abnormal region including the initial region D as an abnormal region that has a small area and clear difference from the surroundings (i.e. the concentration difference from the surroundings is large) (step S131). This is because the integration processing converges before the area of the integration region is widened to the threshold Th_area, and the contour of the integration region is defined based on the determination that the difference of color feature data or the edge strength between the integration region and an adjacent pixel is greater than a threshold (step S124: No). Therefore, it is determined that the abnormal region has a high check priority.

By contrast, when it breaks out of loop A based on the determination (step S126: No) that the area of the integration region is greater than the threshold Th_area (step S130: the area of the integration region is greater than the threshold), the region determining unit 130 performs processing in step S132 and subsequent steps.

Here, when the area of the integration region is greater than the threshold Th_area, following two states are possible. First, as illustrated in FIG. 8A, an expansion region $E_1$ expanded from an initial region $D_1$ of the starting point stays within an abnormal region $Q_1$ that is essentially present in an image $G_1$, that is, there is a state where the expansion is ongoing. Second, as illustrated in FIG. 9A, there is a state where an expansion region $E_2$ expanded from an initial region $D_2$ has been expanded over an abnormal region $Q_2$ that is essentially present in an image $G_2$. Therefore, the region determining unit 130 performs processing of determining the above first and second states. Incidentally, FIG. 8B is a graph illustrating changes in color feature data in the $A_1$-$A_1$ line of the image G1. Also, FIG. 9B is a graph illustrating changes in color feature data in the $A_2$-$A_2$ line of the image G2.

In step S132, the initial region feature data calculation unit 131 calculates an average value of G/R values as average color feature data in the initial region. Also, in step S133, the expansion region feature data calculation unit 132 calculates an average value of G/R values as average color feature data in the expansion region.

In step S134, the difference calculation unit 133 calculates a difference between the average color feature data in the initial region and the average color feature data in the expansion region.

In step S135, the region determining unit 130 determines whether the difference of average color feature data between the initial region and the expansion region is equal to or greater than a predetermined threshold. Here, as illustrated in FIG. 8A, when the expansion region $E_1$ stays within the abnormal region $Q_1$, since it can say that the initial region $D_1$ and the expansion region $E_1$ have the same color feature data, as illustrated in FIG. 8B, a difference $\Delta C_1$ of average color feature data between these is not so large. Meanwhile, as illustrated in FIG. 9A, when the expansion region $E_2$ is expanded over the abnormal region $Q_2$, as illustrated in FIG. 9B, it is predicted that a difference $\Delta C_2$ of average color feature data between the initial region $D_2$ in the abnormal region $Q_2$ and the expansion region $E_2$ outside the abnormal region $Q_2$ becomes large. Therefore, by comparing the differences $\Delta C_1$ and $\Delta C_2$ with a predetermined threshold, it is possible to determine in what state the expansion regions $E_1$ and $E_2$ with respect to the abnormal regions $Q_1$ and $Q_2$ are.

When the difference of average color feature data is less than the threshold (step S135: No), the region determining unit 130 determines that the abnormal region including the initial region is an abnormal region of a large area (step S136). This corresponds to the states illustrated in FIGS. 8A and 8B.

By contrast, when the difference of average color feature data is equal to or greater than the threshold (step S135: Yes), the region determining unit 130 determines the abnormal region including the initial region as an abnormal region that has a small area and less difference from the surroundings (i.e. the concentration difference from the surroundings is small) (step S137). This is because it corresponds to the states illustrated in FIGS. 9A and 9B and the integration region is expanded without meeting the determination in step S124. Therefore, it is determined that the check priority of the abnormal region is relatively low.

After that, the processing returns to the main routine.

In step S14, the calculator 100 adds a flag indicating the determination result in step S13 to image data corresponding to the image of the determination target and records it in the recording unit 50.

As described above, according to the first embodiment, it is possible to detect an expansion region by expanding an initial region detected from an intraluminal image and determine to which of classification items formed with an area size and degree of concentration difference from the surroundings an abnormal region included in the intraluminal image corresponds, based on an area of the expansion region and average color feature data of the initial region and the expansion region. Therefore, based on such classification, it is possible to extract only intraluminal images of high check priority from a series of intraluminal images and display them in the display unit 40 or display them in the display unit 40 in order of an intraluminal image of the highest check priority.

In the first embodiment, although an abnormal region is classified using a G/R value, it is possible to use other color feature data.

Variation 1

In the first embodiment, although an average value of the entire color feature data (i.e. G/R value) in each region is used as feature data of the initial region and the expansion region, it is possible to use other data as long as it can be used as data to determine whether the expansion region is over the boundary of an essential abnormal region. To be more specific, as feature data of the initial region, it may be possible to use the minimum color feature data (i.e. minimum G/R value) held by a pixel in the initial region. Also, as feature data of the expansion region, it may be possible to use an average value of color feature data of pixels included in the contour of the expansion region (i.e. contour average G/R value). Alternatively, as feature data of the expansion region, it may be possible to extract a region excluding the initial region from the expansion region and use an average value of color feature data in the extracted region.

Second Embodiment

Next, a second embodiment of the present invention will be explained.

Figure 10:
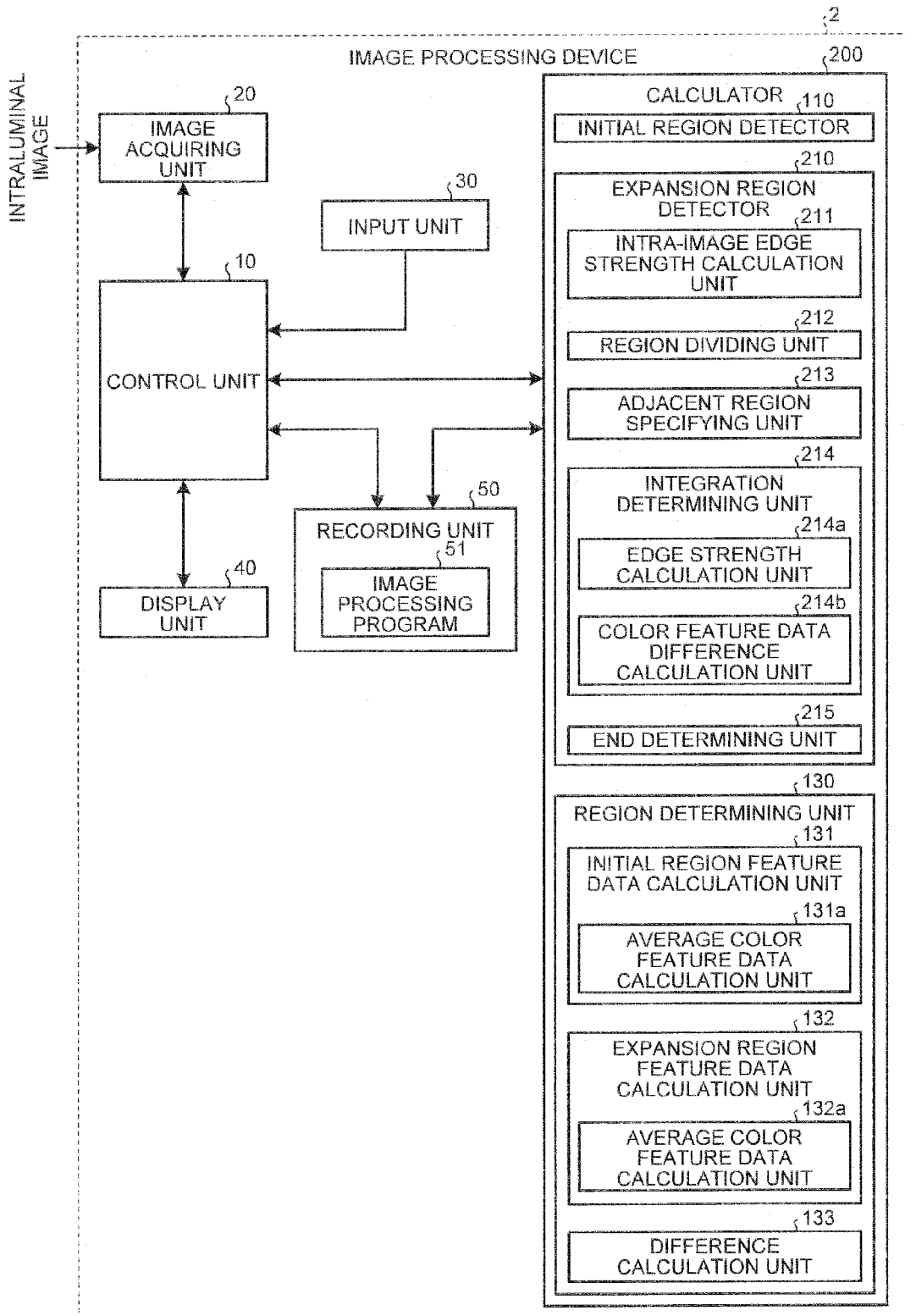
FIG. 10 is a block diagram illustrating a configuration of an image processing device according to a second embodiment of the present invention.

FIG. 10 is a block diagram illustrating a configuration of an image processing device according to the second embodiment. An image processing device 2 according to the second embodiment has a calculator 200 instead of the calculator 100 illustrated in FIG. 1.

The calculator 200 has an expansion region detector 210 including: an intra-image edge strength calculation unit 211; a region dividing unit 212; an adjacent region specifying unit 213; an integration determining unit 214 including an edge strength calculation unit 214a and a color feature data difference calculation unit 214b; and an end determining unit 215, instead of the expansion region detector 120 illustrated in FIG. 1. The intra-image edge strength calculation unit 211 calculates the edge strength in each pixel in an image of a processing target. The region dividing unit 212 divides an intraluminal image into a plurality of regions (hereinafter referred to as "edge region"), using the ridge of edge strength as a boundary. The adjacent region specifying unit 213 to the end determining unit 215 expand an initial region detected from the image in units of edge regions divided by the region dividing unit 212, instead of pixel units.

Next, operations of the image processing device according to the second embodiment will be explained. The overall operation of the image processing device according to the second embodiment is similar to that illustrated in FIG. 3 and processing content in step S12 differs from that of the first embodiment.

Figure 11:
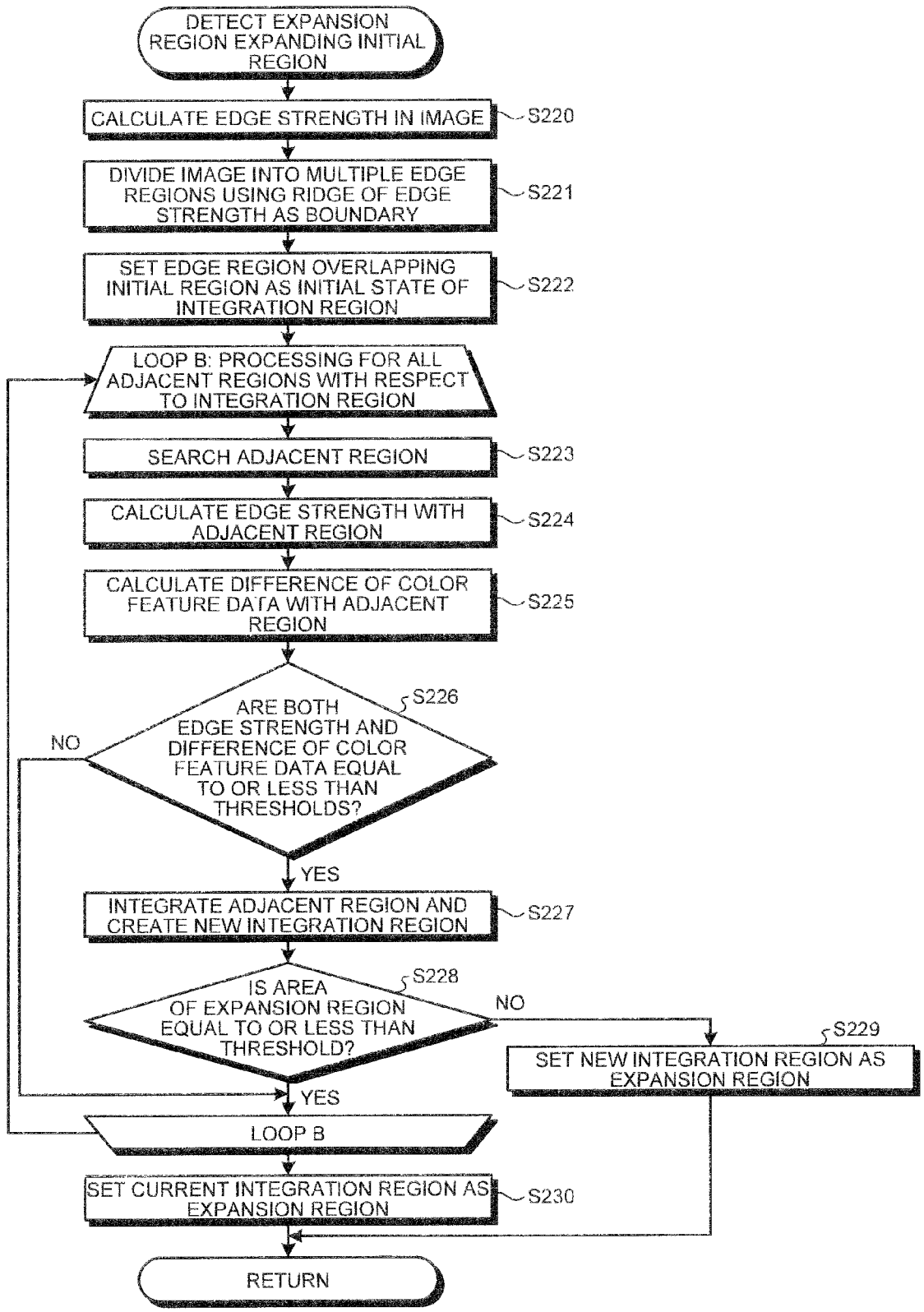
FIG. 11 is a flowchart illustrating specific processing performed by an expansion region detector illustrated in FIG. 10.

FIG. 11 is a flowchart specifically illustrating processing in step S12.

First, in step S220, the intra-image edge strength calculation unit 211 calculates the edge strength of each pixel included in an image of a processing target. When calculating the edge strength, a well-known method like differential filter processing such as a Sobel filter may be used.

In subsequent step S221, the region dividing unit 212 divides the image into a plurality of edge regions using the ridge of edge strength as a boundary. To be more specific, an edge strength image is created based on the edge strength calculated in step S220 and a gradient direction of the edge strength in each pixel in the edge strength image. It is assumed that the gradient direction at this time is a direction in which the edge direction strength becomes small. Pixels of the minimal value, which are reached when moving from each pixel along the gradient direction, are searched, and the image is divided such that pixels of departure points reaching adjacent pixels of the minimal value are included in the same region (See WO 2006/080239).

As an image dividing method, in addition to the above, it is possible to use well-known methods such as a watershed and an algorithm (reference: Luc Vincent and Pierre Soille, "Watersheds in Digital Spaces: An Efficient Algorithm Based on Immersion Simulations", IEEE Transactions on Pattern Analysis and Machine Intelligence, Vol. 13, No. 6, pp. 583-598, June 1991).

In step S222, the expansion region detector 210 selects an edge region overlapping the initial region detected in step S11 and sets this edge region as an initial state of the integration region.

Subsequently, the expansion region detector 210 performs processing of loop B on all edge regions adjacent to the set integration region (which hereinafter may be referred to as "adjacent region").

First, in step S223, the adjacent region specifying unit 213 searches an edge region adjacent to the integration region (hereinafter referred to as "adjacent region").

In step S224, the edge strength calculation unit 214a calculates the edge strength between the searched adjacent region and the integration region. In the second embodiment, an average value of a difference of R component values in adjacent pixels in the boundary between the adjacent region and the integration region (i.e. a contour pixel in the integration region and a contour pixel in the adjacent region adjacent thereto), is calculated as the edge strength.

In step S225, the color feature data difference calculation unit 214b calculates a difference of color feature data between the adjacent region and the integration region. In the second embodiment, a G/R value that is a ratio of the R component and the G component is used as color feature data, and a difference between an average value of G/R values in the adjacent region and an average value of G/R values in the integration region is calculated.

In step S226, the integration determining unit 214 determines whether the edge strength calculated in step S224 is equal to or less than a predetermined threshold Th_edge and the difference of color feature data calculated in step S225 is equal to or less than a predetermined threshold Th_ch.

When it is determined that both the edge strength and the difference of color feature data are equal to or less than the predetermined thresholds (step S226: Yes), the expansion region detector 210 integrates the adjacent region of the determination target to the integration region and creates a new integration region (step S227).

Further, in step S228, the end determining unit 215 determines whether the area of the integration region is equal to or less than a predetermined threshold Th_area. When it is determined that the area of the integration region is equal to or less than the threshold Th_area (step S228: Yes), the expansion region detector 210 repeats the processing of loop B for an adjacent region that is not set as a determination target yet among adjacent regions of the new integration region.

By contrast, when it is determined that the area of the integration region is greater than the threshold Th_area (step S228: No), the expansion region detector 210 finishes the detection processing in the expansion region and sets the newly created integration region as an expansion region (step S229). After that, the processing returns to the main routine.

In step S226, when it is determined that one or both of the edge strength and difference of color feature data are greater than the thresholds (step S226: No), the expansion region detector 210 does not integrate the adjacent region of the determination target and repeats the processing of loop B for an undetermined adjacent region. When the processing on all adjacent regions surrounding the integration region is finished, the detection processing in the expansion region is finished and the current integration region is set as an expansion region (step S230). After that, the processing retunes to the main routine.

As described above, according to the second embodiment, an integration region is expanded in units of edge regions having a plurality of pixels, it is possible to generate an expansion region reflecting the feature of each edge and improve the operation speed.

Third Embodiment

Next, a third embodiment of the present invention will be explained.

Figure 12:
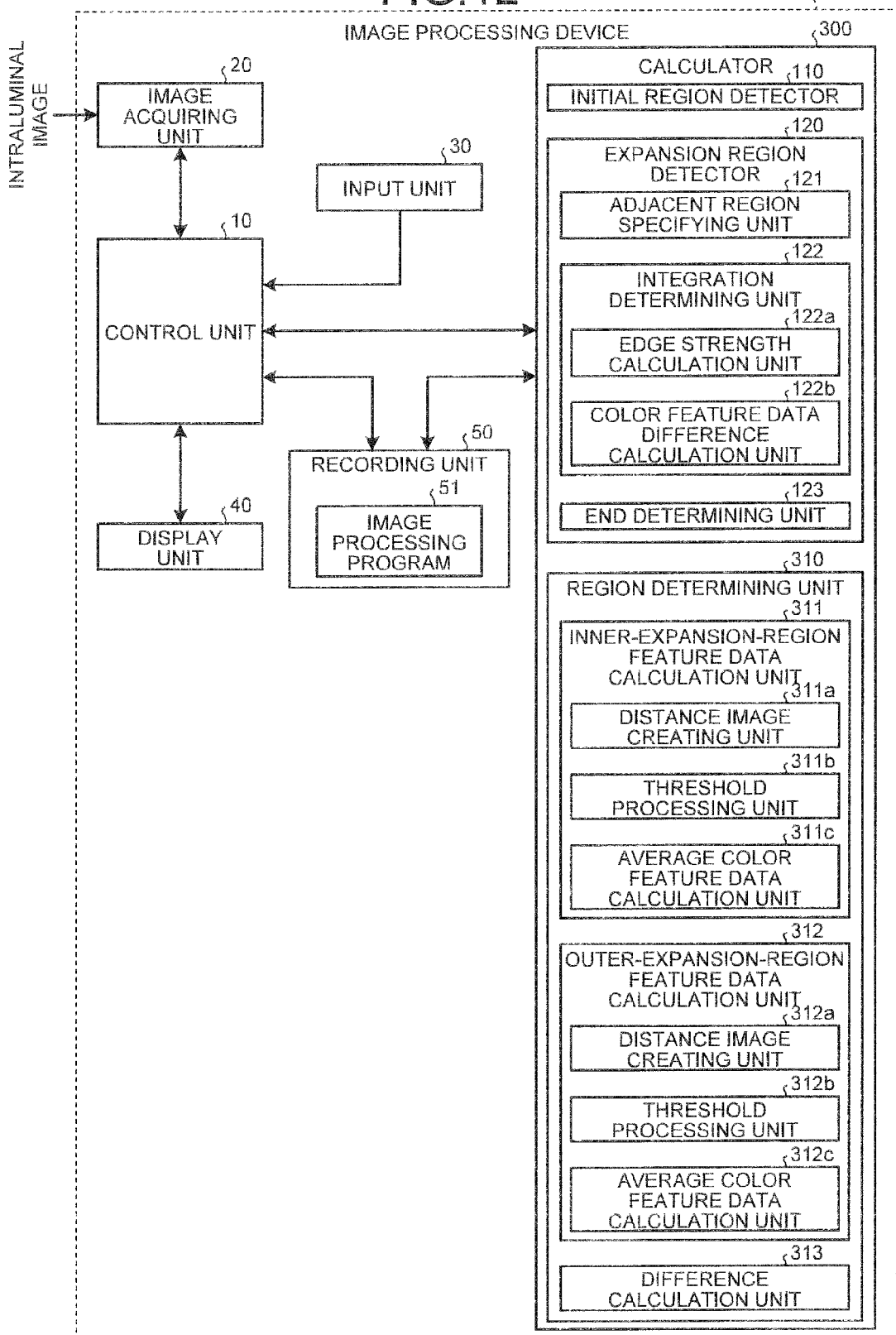
FIG. 12 is a block diagram illustrating a configuration of an image processing device according to a third embodiment of the present invention.

FIG. 12 is a block diagram illustrating a configuration of an image processing device according to the third embodiment. As illustrated in FIG. 12, an image processing device 3 according to the third embodiment has a calculator 300 instead of the calculator 100 illustrated in FIG. 1.

Instead of the region determining unit 130 illustrated in FIG. 1, the calculator 300 has a region determining unit 310 including: an inner-expansion-region feature data calculation unit 311 that calculates feature data (or inner-expansion-region feature data) in a region (or internal region) set inside an expansion region; an outer-expansion-region feature data calculation unit 312 that calculates feature data (or outer-expansion-region feature data) in a region (or external region) set outside the expansion region; and a difference calculation unit 313 that calculates a difference between the inner-expansion-region feature data and the outer-expansion-region feature data.

The inner-expansion-region feature data calculation unit 311 includes a distance image creating unit 311a that creates a distance image indicating a distance from each pixel in the image to the contour of the expansion region, a threshold processing unit 311b that performs threshold processing on a region corresponding to the inside of the expansion region in the distance image, and an average color feature data calculation unit 311c that calculates an average value of color feature data in the internal region.

The outer-expansion-region feature data calculation unit 312 includes a distance image creating unit 312a that creates a distance image from each pixel in the image to the contour of the expansion region, a threshold processing unit 312b that performs threshold processing on a region corresponding to the outside of the expansion region in the distance image, and an average color feature data calculation unit 312c that calculates an average value of color feature data in the external region.

Next, operations of the image processing device 3 will be explained. The overall operation of the image processing device 3 according to the third embodiment is similar to that illustrated in FIG. 3 and processing content in step S13 differs from that of the first embodiment. That is, in the first embodiment, a difference between color feature data in an initial region and color feature data in an expansion region is used when determining an area size of an abnormal region, while, in the third embodiment, a difference between color feature data inside the expansion region and color feature data outside the expansion region is used.

FIG. 13 is a flowchart illustrating specific processing in step S13.

First, in step S330, the region determining unit 310 determines an end condition at the time of the end of integration region expansion processing (i.e. processing in loop A) in step S12.

When a determination for all adjacent pixels of the integration region is finished to break out of loop A (step S330: all adjacent pixels have been determined), the region determining unit 310 determines an abnormal region including the initial region D as an abnormal region that has a small area and clear difference from the surroundings (i.e. the concentration difference from the surroundings is large) (step S331). This is because the integration processing converges before the area of the integration region is widened to a threshold Th_area, and the contour of the integration region is defined based on the determination that the difference of color feature data or the edge strength between the integration region and an adjacent pixel is greater than a threshold (step S124: No).

By contrast, when it breaks out of loop A based on the determination (step S126: No) that the area of the integration region is greater than the threshold Th_area (step S330: the area of the integration region is greater than the threshold), the region determining unit 310 performs processing in step S332 and subsequent steps.

Figure 14A:
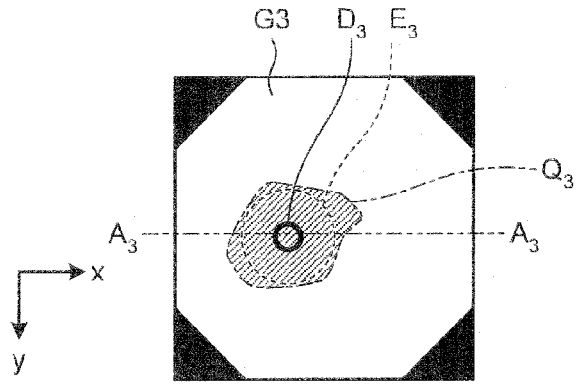
FIG. 14A is a schematic view illustrating a case where an expansion region stays within an abnormal region.
Figure 14B:
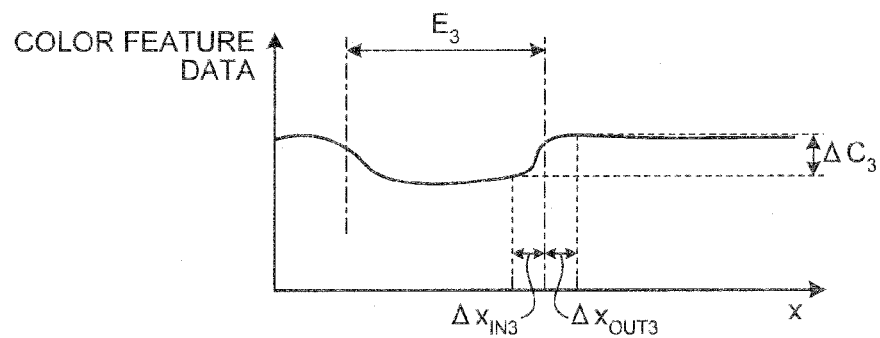
FIG. 14B is a graph illustrating changes of color feature data in the case illustrated in FIG. 14A.
Figure 15A:
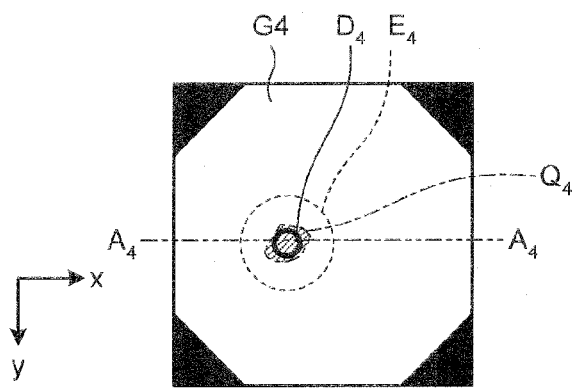
FIG. 15A is a schematic view illustrating a case where an expansion region is expanded over an abnormal region.
Figure 15B:
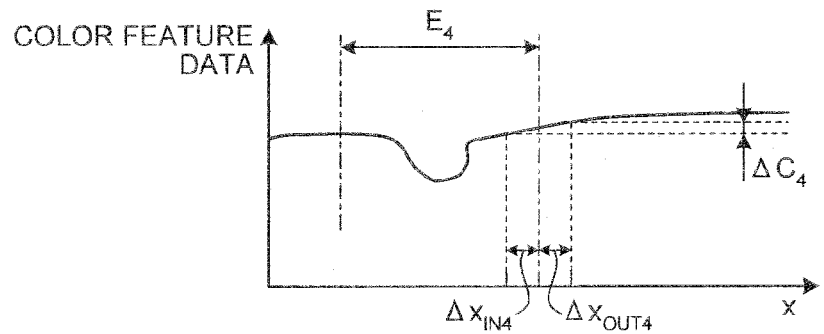
FIG. 15B is a graph illustrating changes of color feature data in the case illustrated in FIG. 15A.

Here, when the area of the integration region is greater than the threshold Th_area, following two states are possible. First, as illustrated in FIG. 14A, an expansion region $E_3$ expanded from an initial region $D_3$ of the starting point stays within an abnormal region $Q_3$ that is essentially present in an image G3, that is, there is a state where the expansion is ongoing. Second, as illustrated in FIG. 15A, there is a state where an expansion region $E_4$ expanded from an initial region $D_4$ has been expanded over an abnormal region $Q_4$ that is essentially present in an image G4. Therefore, the region determining unit 310 performs processing of determining the above first and second states. Incidentally, FIG. 14B is a graph illustrating changes in color feature data along the x direction in the $A_3$-$A_3$ line of the image G3. Also, FIG. 15B is a graph illustrating changes in color feature data along the x direction in the $A_4$-$A_4$ line of the image G4.

In step S332, the distance image creating unit 311a creates a distance image having a value corresponding to the distance between each pixel in the image and the contour of the expansion region as the pixel value of each pixel. As a creation method of a distance image, it is possible to adopt a well-known method (reference: Tomio HIRATA, Toshihiro KATO, "Euclidean Distance Transform Algorithm," Information Processing Society of Japan, AL, Algorithm Research Report, 94 (82), 25-31, Sep. 21, 1994). Also, this processing may be performed by the distance image creating unit 312a.

In step S333, the threshold processing unit 311b extracts a region of pixels having pixel values equal to or less than a predetermined threshold in the expansion region and sets the extracted region as an internal region of the expansion region.

In step S334, the threshold processing unit 312b extracts a region of pixels having pixel values equal to or less than a predetermined threshold outside the expansion region and sets the extracted region as an external region of the expansion region.

In step S335, the average color feature data calculation unit 311c calculates average color feature data in the internal region of the expansion region. In the third embodiment, an average value of G/R values of pixels included in the internal region is calculated as the average color feature data.

Similarly, in step S336, the average color feature data calculation unit 312c calculates an average value of G/R values of pixels included in the external region, as average color feature data in the external region.

In step S337, the difference calculation unit 313 calculates a difference between the average color feature data of the internal region and the average color feature data of the external region.

In step S338, the region determining unit 310 determines whether the difference of average color feature data is equal to or less than a predetermined threshold. Here, as illustrated in FIGS. 14A and 14B, when the expansion region $E_3$ stays within the abnormal region $Q_3$, it is assumed that the boundary of the expansion region $E_3$ is present near the boundary of the abnormal region $Q_3$. In this case, it is considered that a difference $\Delta C_3$ between the average color feature data of an internal region $\Delta x_{IN3}$ of the expansion region $E_3$ and the average color feature data of the external region $\Delta x_{OUT3}$ of the expansion region $E_3$ is large in some degree. By contrast, as illustrated in FIGS. 15A and 15B, when the expansion region $E_4$ is expanded over the abnormal region $Q_4$, it is assumed that the boundary of the expansion region $E_4$ is apart from the boundary of the abnormal region $Q_4$. In this case, it is considered that there is less change in color feature data near the expansion region $E_4$ and a difference $\Delta C_4$ between the average color feature data of an internal region $\Delta x_{IN4}$ of the expansion region $E_4$ and the average color feature data of the external region $\Delta x_{OUT4}$ of the expansion region $E_4$ is less than in the case FIGS. 14A and 14B. Therefore, by comparing the differences $\Delta C_3$ and $\Delta C_4$ with a predetermined threshold, it is possible to determine in which state the expansion regions $E_3$ and $E_4$ with respect to the abnormal regions $Q_3$ and $Q_4$ are.

When the difference of average color feature data is greater than the threshold (step S338: No), the region determining unit 310 determines the abnormal region including the initial region D as an abnormal region of a large area (step S339). This corresponds to the state illustrated in FIGS. 14A and 14B.

By contrast, when the difference of average color feature data is equal to or less than the threshold (step S338: Yes), the region determining unit 310 determines the abnormal region including the initial region D as an abnormal region that has a small area and little difference from the surroundings (i.e. the concentration difference from the surroundings is small) (step S340). This is because it corresponds to the state illustrated in FIGS. 15A and 15B and the integration region is expanded without meeting the determination in step S124.

After that, the processing returns to the main routine.

As described above, according to the third embodiment, an area of an abnormal region is determined based on a difference between color feature data inside an expansion region and color feature data outside the expansion region, and therefore it is possible to perform classification reflecting information of the vicinity of the expansion region contour.

Variation 2

In the third embodiment, although an internal region and an external region are set by performing threshold processing on a distance image, it may be possible to set the internal and external regions by other methods. For example, in a distance image, it may be possible to detect pixels having pixels values within a specific range (i.e. value corresponding to a distance from an expansion region) in a region corresponding to the inside (or outside) of the expansion region in the distance image, and set the region of the pixels as the internal (or external) region.

As described above, according to the first to third embodiments, at least part of a region of interest included in an image is detected and set as an initial region, an expansion region acquired by expanding the initial region is detected, and, based on feature data of the initial region and the expansion region, it is determined to which of classification items the region of interest including the above abnormal region belongs. Therefore, the user can easily determine whether the region of interest has to be preferentially observed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a processor; and
   a memory storing instructions, wherein the instructions cause the processor to:
   detect at least a part of a region of interest included in an image;
   set the at least a part of the region of interest as an initial region;
   detect an expansion region by expanding the initial region;
   calculate color feature data of the initial region and color feature data of the expansion region;
   calculate a difference between the color feature data of the initial region and the color feature data of the expansion region;
   determine to which one of multiple classification items the region of interest belongs based on the difference between the color feature data of the initial region and the color feature data of the expansion region, wherein the multiple classification items include:
- a region having an area of the region of interest greater than a first predetermined threshold;
- a region having an area of the region of interest equal to or less than the first predetermined threshold and in which the difference between the color feature data in the region of interest and the color feature data surrounding the region of interest is greater than a second predetermined threshold; and
- a region having an area of interest equal to or less than the first predetermined threshold and in which the difference between the color feature data in the region of interest and the color feature data surrounding the region of interest is equal to or less than the second predetermined threshold; and determine a check priority of the region of interest based on the one of the multiple classification items to which the region of interest is determined to belong.

2. The image processing device according to claim 1, wherein the instructions cause the processor to:
set the initial region as an initial state of an integration region; and
repeatedly perform an integration processing comprising:
- specifying an adjacent region that is adjacent to the integration region;
- calculating feature data of the integration region and feature data of the adjacent region;
- determining whether to integrate the adjacent region to the integration region based on the feature data of the integration region and the feature data of the adjacent region; and
- determining whether to finish the integration processing based on an area of the integration region.

3. The image processing device according to claim 2, wherein the instructions cause the processor to:
- calculate an edge strength between the integration region and the adjacent region; and
- determine whether to integrate the adjacent region to the integration region based on the edge strength.

4. The image processing device according to claim 2, wherein the instructions cause the processor to:
- calculate a difference between color feature data of the integration region and color feature data of the adjacent region; and
- determine whether to integrate the adjacent region to the integration region based on a difference between the color feature data of the integration region and the color feature data of the adjacent region.

5. The image processing device according to claim 2, wherein the instructions cause processor to, in a case where the area of the integration region is determined to be equal to or greater than a predetermined size, finish the integration processing.

6. The image processing device according to claim 1, wherein the instructions cause the processor to calculate an average value of color feature data in the initial region as the color feature data of the initial region.

7. The image processing device according to claim 1, wherein the instructions cause the processor to calculate a minimum value of color feature data in the initial region as the color feature data of the initial region.

8. The image processing device according to claim 1, wherein the instructions cause the processor to calculate an average value of color feature data in the expansion region as the color feature data of the expansion region.

9. The image processing device according to claim 1, wherein the instructions cause the processor to:
- extract a region different from the initial region in the expansion region; and
- calculate an average value of color feature data in the region different from the initial region in the expansion region as the color feature data of the expansion region.

10. The image processing device according to claim 1, wherein the instructions cause the processor to calculate an average value of color feature data in a contour part of the expansion region as the color feature data of the expansion region.

11. The image processing device according to claim 1, wherein the processor is configured to determine to which one of the multiple classification items the region of interest belongs by:
- performing a comparison of a change in the color feature data of the initial region and the color feature data of the expansion region to a predetermined threshold; and
- determining to which one of the multiple classification items the region of interest belongs based on a result of the comparison of the change in the color feature data of the initial region and the color feature data of the expansion region to the predetermined threshold.

12. An image processing method comprising:
detecting at least a part of a region of interest included in an image;
setting the at least a part of the region of interest as an initial region;
detecting an expansion region by expanding the initial region;
calculating color feature data of the initial region and color feature data of the expansion region;
calculating a difference between the color feature data of the initial region and the color feature data of the expansion region;
determining to which one of multiple classification items the region of interest belongs based on the difference between the color feature data of the initial region and the color feature data of the expansion region, wherein the multiple classification items include:
- a region having an area of the region of interest greater than a first predetermined threshold;
- a region having an area of the region of interest equal to or less than the first predetermined threshold and in which the difference between the color feature data in the region of interest and the color feature data surrounding the region of interest is greater than a second predetermined threshold; and
- a region having an area of interest equal to or less than the first predetermined threshold and in which the difference between the color feature data in the region of interest and the color feature data surrounding the region of interest is equal to or less than the second predetermined threshold; and determining a check priority of the region of interest based on the one of the multiple classification items to which the region of interest is determined to belong.

13. A non-transitory computer-readable medium having stored thereon an image processing program that, when executed, causes a computer to perform a process comprising:

detecting at least a part of a region of interest included in an image;

setting the at least a part of the region of interest as an initial region;

detecting an expansion region by expanding the initial region;

calculating color feature data of the initial region and color feature data of the expansion region;

calculating a difference between the color feature data of the initial region and the color feature data of the expansion region;

determining to which one of multiple classification items the region of interest belongs based on the difference between the color feature data of the initial region and the color feature data of the expansion region, wherein the multiple classification items include:

a region having an area of the region of interest greater than a first predetermined threshold;

a region having an area of the region of interest equal to or less than the first predetermined threshold and in which the difference between the color feature data in the region of interest and the color feature data surrounding the region of interest is greater than a second predetermined threshold; and a region having an area of interest equal to or less than the first predetermined threshold and in which the difference between the color feature data in the region of interest and the color feature data surrounding the region of interest is equal to or less than the second predetermined threshold; and determining a check priority of the region of interest based on the one of the multiple classification items to which the region of interest is determined to belong.

* * * * *